J. C. MOE.
DEVICE FOR RAISING AUTOMOBILE TOPS.
APPLICATION FILED FEB. 11, 1913.

1,101,755.

Patented June 30, 1914.
2 SHEETS—SHEET 1.

Witnesses.
George H. Morse.
Nils Johansson.

Inventor.
James C. Moe.
By Henry L. Reynolds.
Attorney.

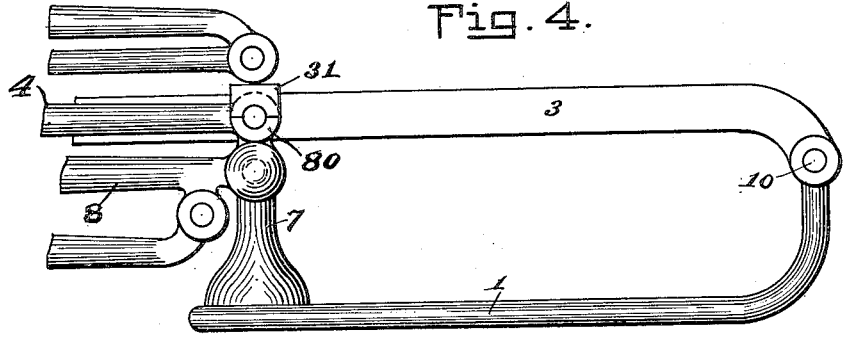
Fig. 4.
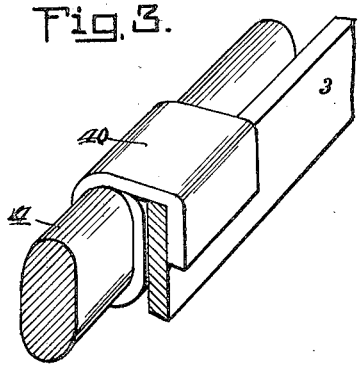
Fig. 3.
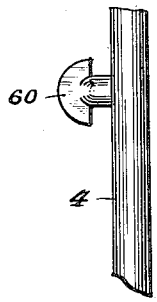
Fig. 5.
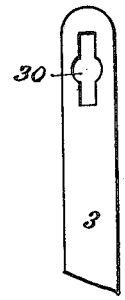
Fig. 6.
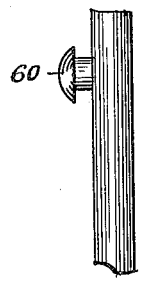
Fig. 7. Fig. 8. Fig. 9.
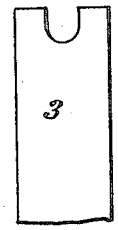

UNITED STATES PATENT OFFICE.

JAMES C. MOE, OF POULSBO, WASHINGTON.

DEVICE FOR RAISING AUTOMOBILE-TOPS.

1,101,755.  Specification of Letters Patent.  Patented June 30, 1914.

Application filed February 11, 1913. Serial No. 747,802.

*To all whom it may concern:*

Be it known that I, JAMES C. MOE, a citizen of the United States, and resident of Poulsbo, in the county of Kitsap and State of Washington, have invented certain new and useful Improvements in Devices for Raising Automobile-Tops, of which the following is a specification.

My invention relates to automobile top raising devices, and comprises the novel parts and combinations of parts which will be hereinafter described and particularly pointed out in the claims.

The object of my invention is to provide a device, preferably in such form that it may be attached to automobiles after built, by means of which the tops may be readily raised or lowered. The device may be made an integral part of the car when built, but may be attached after sale if desired.

In the accompanying drawings I have shown my device in the form which is now preferred by me when the same is to be applied as an attachment.

Figure 1:
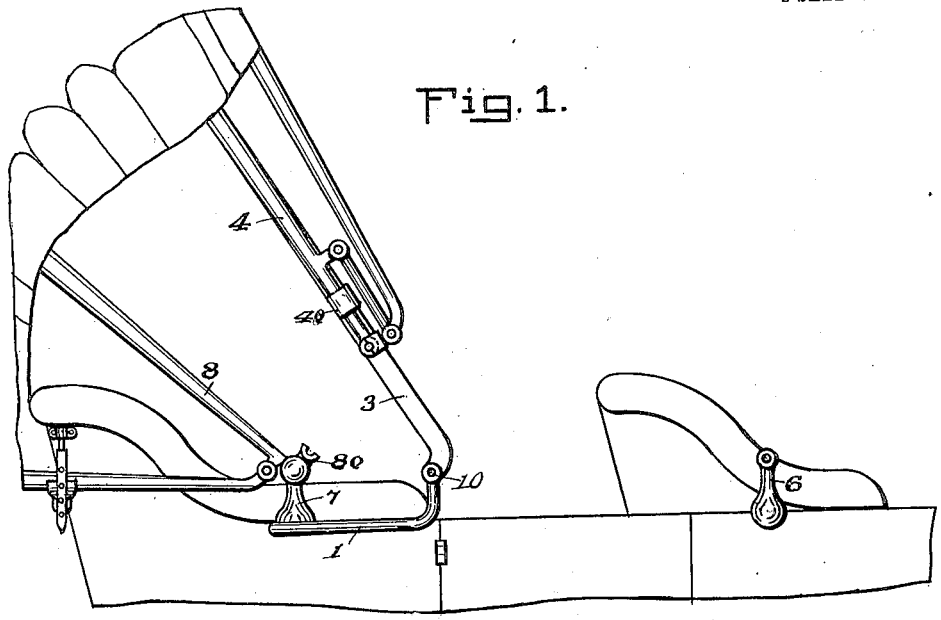
Figure 2:
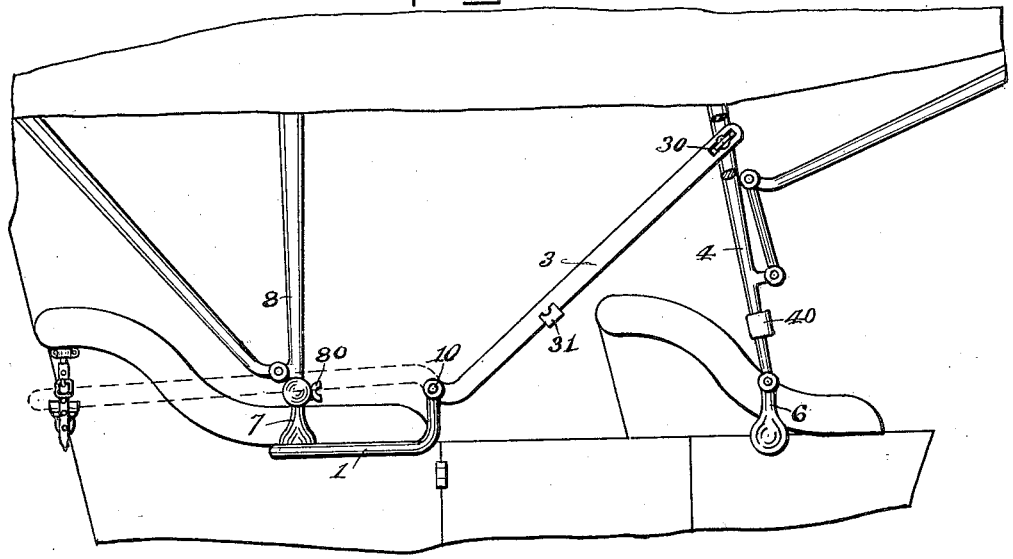

Figure 1 is a side elevation of an automobile having my device thereon, the top-raising movement having been started. Fig. 2 shows the same parts in the position occupied when the forward bows are secured in place, but the top as not yet tightened by the forwardly extending straps. Fig. 3 is a perspective showing the clip by which the raising lever engages the forward bows near their pivots. Fig. 4 is a side elevation showing the parts in the position assumed when the top is down. Fig. 5 shows the form of pin carried by the forward bow for engagement by the carrying bar. Figs. 6 to 9 inclusive show differing constructions by which the swinging end of the raising lever may be secured to the forward bows while raising the same.

My device is intended for use more particularly with that type of automobile covers which consist of a fabric supported upon bows which may be folded down when not wanted and which employ two sets of bows, a forward and a rearward set, the forward set being detachable and folded down with the rearward set when not in use.

While I will herein show and describe my invention as applied to automobiles, it is evident that it may as advantageously be applied to any kind of carriage where the same type of top and supporting bows are used. The raising of such a cover is a job which, without any special provision of mechanism for facilitating the work, properly requires two persons, and is, even then, quite a job. By the use of my invention it becomes an easy job for one person and may be done without getting out of the car.

At each side of the car I provide a pivot support, or fulcrum, for an end of the raising lever 3, which fulcrum is preferably located near the edge of the rear seat and in line with the pivot supports of the bows. The more essential point is that such a support be provided between the normal supporting points of the rear and front sets of bows, that is between the points 6 and 7 as shown on the drawings. This pivot support may be differently constructed and secured to best adapt it to cars of different dimensions and constructions, and may be made for permanent attachment or for application only when raising or lowering the top, as may be desired or necessitated by differing conditions. I have shown it as permanently secured to the car.

As herein shown, the fulcrum pivot for the raising lever consists of an arm 1, which is secured by the same bolt which secures the bracket 7 upon which the rear set of bows is pivoted. This arm 1 extends forward and upward and is provided at this forward end, with a hole for the reception of the pivot bolt 10, by which the raising lever 3 is secured thereto. Any suitable manner of connecting and supporting the lever 3 therefrom, would be equivalent thereto. The swinging end of the raising lever 3 and the upper portion of the forward bow 4, are provided with means by which the two may be temporarily engaged when raising the top. The means illustrated in Figs. 5 and 6, consist in providing the end of the lever 3 with a double-keyhole shaped slot 30 and the bow 4 with a T-shaped headed pin. In this type of means for securing these parts, the angular position of the T-headed pin 60, upon the bow, 4 may be such that the lever 3 may be placed upon, or removed from the pin, only when they are in the raised position, or that shown in Fig. 2. In all other positions of the parts it will be impossible to separate them, which will prevent accidental separation when not desired.

In Figs. 7 and 8, the lever is shown as having an ordinary keyhole slot 30, and the pin has an ordinary round head. In this construction the lever may be removed, with the bows in any position, by moving the bows toward the upper end of the lever. The construction shown in Fig. 9 is simply an end opening slot in the lever, adapted to receive a pin on the bow. It is common, upon cars having this type of cover, to provide an ear secured to the rear set of bows at their pivot, to which the forward set of bows are secured when the latter are folded down. In such case, the bolt by which the forward bows are secured in place, is inserted in said ear and holds the forward bows securely in their folded position. As a matter of convenience, this ear may be cut, so that the hold therein communicates laterally with the exterior, so that the bolt may be inserted by a side movement and when the nut is in place thereon. I have herein shown this ear as so cut at 80. The raising lever 3 is then provided with a side projecting lug 31, so located that it matches with the cut ear 80, when the parts are folded back, bearing upon the bolt and holding the parts securely together. When the top is folded back the bows are usually secured by strapping. The lever 3 may be secured down by the same strap, as is shown in Fig. 2.

In using my device the bows are loosened and the levers 3 (one being placed at each side of the car) are raised and swung forward. In this preliminary movement the forward bows are steadied by engagement of a clip 40, carried by the bow, with the lever 3. This clip is open at one side, so that when the bow 4 gets to a certain position, its lower end may swing clear of the lever 3. When the lever 3 reaches the position shown in full lines in Fig. 2, it supports the forward bows in position, such that they may be secured to their supporting brackets 6, after which the lever 3 may be disengaged and swung back into the position shown by dotted lines in Fig. 2. The cover-tightening forward straps may then be secured. While I have described, in the main, a single lever 3, it is to be understood that two such levers are employed, one at each side of the car. As the second lever and everything connected therewith is a duplicate of the first, a description of one is deemed sufficient.

What I claim as my invention is:

1. An attachment for raising and lowering the bows of automobiles and carriages employing front and rear sets of bows, comprising an arm securable upon the car body, a lever pivoted upon said arm and provided at its swinging end with means for supportingly engaging the forward set of bows, and means for engaging and holding down the forward set of bows by this lever when the forward bows are folded back.

2. An attachment for automobiles and carriages having forward and rear sets of cover supporting bows, comprising a lever, a supporting arm pivoted to one end of the lever and secured to the carriage to locate said pivot between the two sets of bows, the upper or swinging end of the lever being provided with means for supporting engagement with the forward set of bows, and a finger securable upon the forward bows and adapted to have sliding engagement with said lever nearer its pivot.

3. An attachment for automobiles and carriages having forward and rear sets of cover supporting bows, comprising a lever, a supporting arm pivoted to one end of the lever and secured to the carriage to locate said pivot between the two sets of bows, a pivot pin secured to the upper part of the forward set of bows, the upper end of the swinging arm having a recess for the reception of said pin, and a clip or hook-finger securable on the lower part of the forward bows and engaging said swinging lever.

4. In a mechanism for raising and lowering the tops of automobiles and carriages the combination with forward and rear sets of bows, of a lever arm pivoted between said forward and rear sets of bows, the upper or swinging end of said arm and of the forward set of bows being provided with complemental pivot members, the pivot end of the rear set of bows having a pin receiving yoke in position to receive the securing pin of the lower end of the forward bows when the latter are folded down, and a cap block carried by the swinging lever in position to match with said yoke when the lever is thrown backward and down.

5. In an attachment for automobiles and carriages, in combination, front and rear sets of bows, pivoted to fold down, an arm secured to the carriage body and upon which the rear sets of bows are pivoted, an arm securable in common with said bow-pivoting arm and extending toward the pivot position of the forward set of bows, a transferring lever pivoted upon said arm between the pivot positions of forward and rear sets of bows, the swing or upper end of said arm and the upper portion of the forward bows having coöperating pivot connections, the pivot ends of the rear set of bows having a side-opening socket adapted to receive a part carried by the pivot end of the front set of bows, the pivoted transferring lever having a part coöperating with the socket at the pivot ends of the rear bows to clamp the pivot ends of the forward bows when the latter are folded back.

In testimony whereof I have hereunto affixed my signature at Poulsbo Washington, this 3d day of February, 1913.

JAMES C. MOE.

Witnesses:
A. T. ARNESEN,
H. SLIPPERN.